Dec. 19, 1967     C. L. FELDMAN ETAL     3,358,451
HEAT ENGINE APPARATUS AND METHOD
Filed April 29, 1965     2 Sheets-Sheet 1

INVENTORS
CHARLES L. FELDMAN
GEORGE F. HARPER

BY *Rines and Rines*

ATTORNEYS

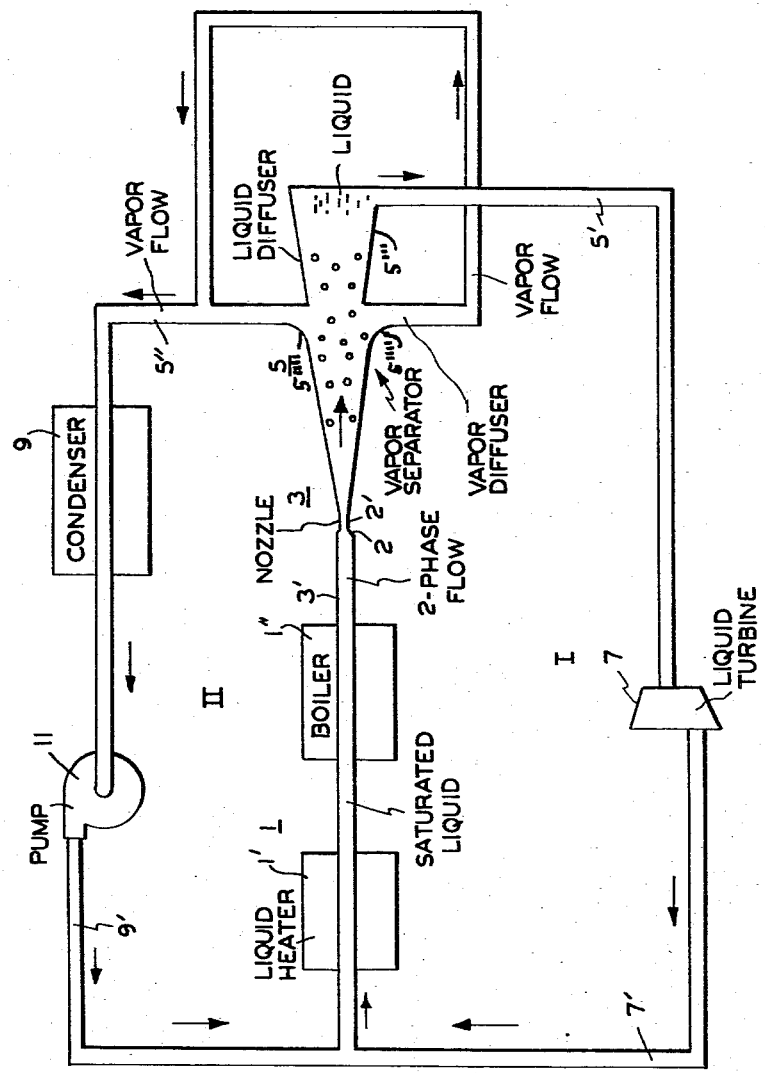

United States Patent Office 3,358,451
Patented Dec. 19, 1967

3,358,451
HEAT ENGINE APPARATUS AND METHOD
Charles L. Feldman, Framingham, and George F. Harper, Wayland, Mass., assignors to Joseph Kaye & Company, Inc., Cambridge, Mass., a corporation of Massachusetts
Filed Apr. 29, 1965, Ser. No. 451,818
18 Claims. (Cl. 60—108)

ABSTRACT OF THE DISCLOSURE

The present disclosure relates to heat engine apparatus in which a fluid is heated to a predetermined temperature and then accelerated in a manner such as to obtain a high velocity, two-phase stream of lower temperature which is then separated into liquid and vapor portions, with the kinetic energy of the liquid portion converted into power and the vapor portion condensed. The condensate and the liquid portion are then fed back at substantially the same pressure to the heating means.

---

Figure 1:
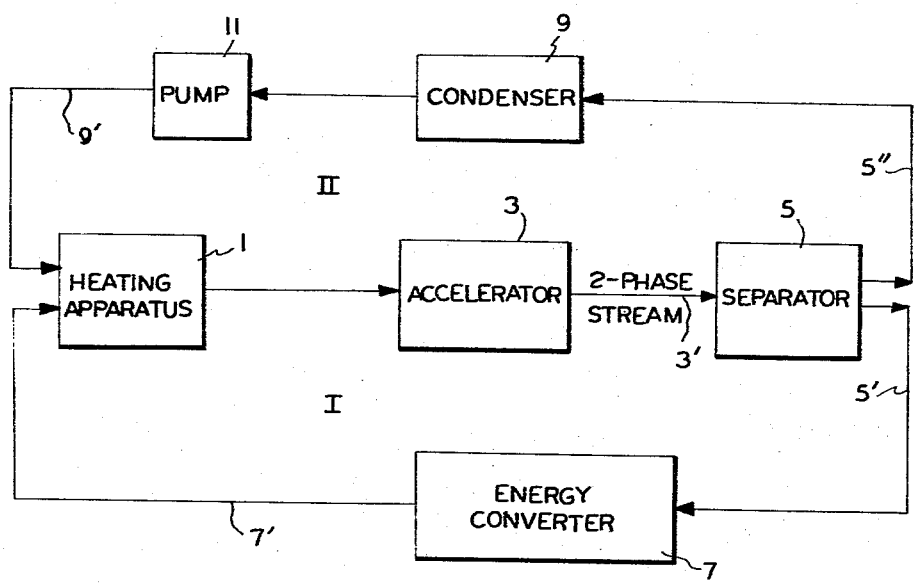

The present invention relates to heat engine apparatus and methods. More particularly, it is directed to the utilization of liquid streams for generating power in such devices as hydraulic motors, magnetohydrodynamic generators and similar types of apparatus.

Numerous proposals have been advanced for extracting work from heat engine cycle systems. Such work can be extracted either as shaft work or as electric power. Included in such prior-art proposals are liquid metal cooled cycles and apparatus which employ magnetohydrodynamic power conversion devices. Among the latter, are systems employing two fluid loops in which a liquid stream may be heated and subsequently accelerated together with a vapor stream for the purpose of providing a high-velocity liquid stream. The kinetic energy of said liquid stream may be converted into power in such devices as the generators and motors abovementioned. In such proposals, for example, a liquid metal, such as potassium, cadmium, cesium, rubidium or the like, is circulated in a closed loop under the influence of thermal means. The conversion of heat energy to work may be effected by ultimately accelerating the liquid while mixed with a separate vapor and then decelerating it without the vapor present. Removal of the vapor from the high velocity stream results in a stagnation pressure rise of the liquid stream. Part of this stagnation pressure may be converted to static pressure recovery for circulating the liquid, and the remainder used to produce electric power.

Unfortunately, however, devices of the above-described character have serious thermodynamic limitations, which it is a specific object of the present invention to overcome. Specifically, the concept of mixing two fluids at different temperatures and at different velocities, and the constraint for the use of immiscible working fluids in such systems, renders them less than economical and desirable. The first two limitations are thermodynamically irreversible; and a further disadvantage resides in the necessity in such systems for accepting heat into the cycle over a range of temperatures rather than at a single temperature in the cycle.

It is an object of the present invention, among others, to overcome the limitations in such apparatus, to remove the said thermodynamically irreversible effects, and to obviate the constraint to the use of immiscible working fluids.

In addition, it is a further object of the invention to provide a new and improved heat engine apparatus and method that are also of more general utility.

Still an additional object is to provide novel subcombinations of such apparatus that are adapted to improve the operation of prior-art systems even though all of the features of the present invention may not be embodied therein.

In summary, from one of its aspects, the invention contemplates heat engine apparatus in which fluid is heated to a predetermined temperature and then accelerated in a manner such as to obtain a high velocity, two-phase stream of lower temperature. The lower temperature, two-phase, high velocity stream is then separated into liquid and vapor portions and the kinetic energy of the liquid portion is converted into power in any desired manner, such as the generation of electricity, the driving of a hydraulic motor, the rotation of a liquid turbine, or the like. The vapor portion, on the other hand, is condensed. Both the condensate and the liquid portion are then fed back at substantially the same pressure to the heating means which, in accordance with the preferred embodiment of the invention, is preferably adjusted to effect boiling of the liquid such that a mixed two-phase hot liquid and vapor output results. From another aspect of the invention, which does not employ all of the features thereof, but introduces advantages to prior-art systems, the heating may not be carried to the boiling stage. In addition, further advantages of the invention may be used without the total preferred system through the appropriate feedback to common temperature and pressure conditions of the condensate and liquid streams prior to the acceleration of the heated mixture of condensed vapor and liquid, such advantages accruing even in systems employing different immiscible liquids or other fluids.

Other and further objects will be explained hereinafter and will be more particularly pointed out in connection with the appended claims.

Figure 3:
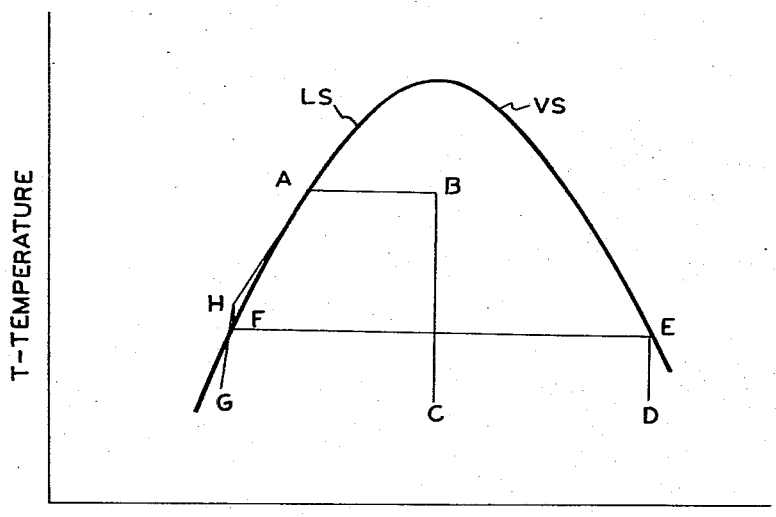

The invention will now be described in connection with the accompanying drawings, FIG. 1 of which is a block diagram illustrating the underlying features of the invention;

FIG. 2 is a schematic diagram of a preferred apparatus for practicing the most effective techniques underlying the invention; and FIG. 3 is a temperature-entropy diagram illustrating the characteristics of operation of the system of FIG. 2.

Referring to FIG. 1, a pair of closed fluid loops are generally indicated at I and II sharing, in common, heating apparatus 1, an accelerator 3 and a liquid-vapor separator 5. The liquid portion of the accelerated fluid stream emanating from the separator 5 is shown applied along path 5' to energy conversion apparatus 7 of any desired type, such as the before mentioned magnetohydrodynamic generators or hydraulic motors or the like, and then along a path 7', being fed back to the heating apparatus 1. The vapor stream emanating from the separator 5 is shown applied along path 5" associated with loop II through a vapor condenser 9 and thence along path 9' under the influence of a pressurizing pump 11 (the function of which will later be explained) and finally back into the heating apparatus 1. In this generic diagram of FIG. 1, the heating apparatus is shown as a single unit, whereas in actual practice it may, if desired, be constituted of several units and even separate units for the individual loops I and II. So far as certain underlying fundamental concepts of the invention are concerned, moreover, as distinguished from the complete preferred system thereof, the loops I and II may contain the same of different fluids as before discussed.

Succinctly stated, the fluid, such as the liquids before mentioned, and, indeed, water or any other fluid that may be desired, is heated in the apparatus 1 to a predetermined temperature and it is then accelerated at 3 to produce a two-phase, high velocity, liquid and vapor stream which is applied at 3' to the before-mentioned separator 5. In the process of accelerating the heated fluid at 3 to obtain such a high velocity, two-phase stream, the temperature of the stream is automatically lowered, thereby determining the heat rejection temperature for the cycle of the system. In the separator 5, the vapor portion of the high-velocity stream that is removed at 5" is decelerated and condensed at 9, being then passed back to the heating apparatus 1. The lowered-temperature liquid portion of the high-velocity stream, on the other hand, is separated out at 5 and is fed along path 5' where it may be passed through energy conversion apparatus 7 for extracting the kinetic energy thereof for the production of some form of power, being then fed back at 7' to the heating apparatus 1. In order to avoid the inherent losses in prior-art two-fluid systems, as above described, both the pressure and temperature of the condensate derived in loop II and the liquid fed back in loop I are preferably substantially equalized prior to their application to the accelerator 3. This represents a departure from two-fluid vapor and liquid loop systems of the prior art wherein the condensate is fed back directly to the accelerator at a temperature very much different from that of the liquid stream fed back from the energy converter via the system heating apparatus. Through the interjection of the heating apparatus in both feedback paths, 7' and 9', prior to the accelerator 3, in accordance with one feature of the present invention, this loss inherent in prior-art systems is obviated. In addition, through the utilization of common or substantially equal temperature heating apparatus 1, in which substantial boiling takes place in the preferred embodiment, heat engine apparatus is provided in which work is removed in the liquid region, substantially all the heat is rejected at a single temperature, most of the heat is accepted at a different single temperature, and there are no inherent irreversibilities, such as mixing of a fluid at different temperatures or different velocities or sudden expansion to lower pressures. If it is desired to utilize the technique of FIG. 1 in connection with two fluid systems, improvement is produced in the elimination of the losses previously described. If, however, in accordance with the preferred embodiment of the present invention, only a single liquid or other fluid is employed, further advantageous features may be attained from the elimination of the necessity to operate under the constraints of the use of immiscible working fluids.

It is to the preferred embodiment of the invention, involving all of the features above-discussed, that the system of FIG. 2 is directed. Common reference numerals corresponding to the generic apparatus illustrated in FIG. 1 are employed in FIG. 2.

The heating apparatus 1 is illustrated in the form of a liquid preheater 1' and a boiler 1" which actually heats the fluid to produce, preferably, a mixed two-phase, hot liquid and vapor output at 3'. The accelerator 3 is shown in the form of a preferred convergent-, divergent-nozzle, the convergent confining portion of which is illustrated at 2 and the divgerging expanding portion at 2'. Such a nozzle has the effect of accelerating the mixed two-phase, hot liquid and vapor output at 3' and producing a high-velocity two-phase stream of lower temperature. Since the liquid portion of the high-velocity stream has a tendency to travel in straight lines and not to negotiate bends, it will continue from left to right in the separator 5 and be separated from the vapor portion of the two-phase, high-velocity stream, because the vapor portion can readily negotiate bends of proper geometry. The high-velocity liquid stream is shown emanating from separator 5 along path 5'. The high-velocity vapor stream is shown separated out along downwardly and upwardly extending joined outlets 5". It is to be understood that the separated-out liquid portion may embody some vapor and that the separated-out vapor portion may embody some liquid; however, in actual practice, the liquid portion will be largely liquid and the separated vapor portion largely vapor, and this is the sense in which the terms liquid and vapor portions are used in this specification and in the claims. It is understood that the relative mass ratio of vapor and liquid that is to be desired to be fed along paths 5' and 5" may be regulated, as is well known in the art.

The separated lower temperature liquid portion at 5' is applied, for illustrative purposes, to a conventional liquid turbine 7 to extract therefrom the kinetic energy and convert it to power. As before stated, other types of energy converters may also readily be employed at 7. The liquid is then fed back at 7' to the liquid heater portion 1' of the heating apparatus 1.

The separated vapor portion at 5" is condensed at 9 and then fed back at 9' to the same liquid heater 1', after being pressurized by the pump 11 to establish substantially the same pressure at the liquid heater 1' as that at which the liquid is fed back from loop I at 7'. In order to decelerate somewhat the separated high-velocity liquid and vapor portions of the stream for such purposes as increasing the pressure of the liquid to drive the turbine or other apparatus 7, and to insure that the output at 5' is substantially in the all-liquid phase, the terminal chamber portions of the separator apparatus may be formed with diverging walls as shown at the right hand portion 5''' of the separator 5 and as shown at the upper and lower outlets 5'''' leading to the vapor path 5''.

Referring to the temperature-entropy diagram of FIG. 3, curve VS–LS represents the boundary between two-phase and single-phase vapor and liquid phases of the fluid. The passage of the fluid through the liquid heater 1' is represented by the line segment HA, raising the temperature and preferably producing saturated liquid at temperature corresponding to point A. The boiler 1" performs the boiling operation for the preferred generation of a two-phase mixture of hot liquid and vapor along straight-line segment AB. The nozzle accelerator 3 produces the steep drop in temperature at substantially the same entropy, represented by the line BC, and the separator 5 effects the substantial separation of the high-velocity liquid-vapor stream into the vapor portion at point D and the liquid portion at point G. The before-described diffusing action of the separator 5 that actually produces the vapor output at 5" is represented by point E near the bottom of the vapor saturation lines, VS. The combination of the diffusing action of the liquid outlet portions of the diffuser 5 and of the device 7 converting the stagnation pressure of the liquid flow into energy or power is represented by the line segment GH. The effect of condensation of the vapor flow at 9 and the re-pressurization at 11 are represented by the horizontal line EF and the vertical segment FH, respectively. Thus, as clearly illustrated in FIG. 3, the pressure and temperature of the fed-back condensate at 9' and of the fed-back liquid at 7' are substantially equalized at the input to the liquid heater 1' and also at the inlet to the accelerating nozzle 3.

While the particular type of convergent-divergent nozzle 3 has been illustrated as the accelerating and temperature-reducing device, it is of course to be understood that other types of accelerators may also be employed, as may other types of vapor separators, heating mechanism and ultimate liquid energy conversion devices 7, all without departing from the spirit and scope of the invention. In addition, as previously discussed, some of the features of the technique and apparatus underlying the invention may even be employed with prior-art two-vapor systems to obtain improved operation; though, as before explained, in the preferred embodiment of the invention, a single fluid is employed for its obvious advantages. Further modifications will also occur to those skilled in the art and all such are considered to fall within the scope and spirit of the invention as defined in the appended claims.

What is claimed is:

1. A method of the character described, that comprises, heating a fluid to a predetermined temperature, accelerating the heated fluid to obtain a high-velocity two-phase stream of lower temperature, separating the lower-temperature two-phase high-velocity stream into liquid and vapor portions, passing the high-velocity liquid portion along a predetermined path, converting the kinetic energy of the passing liquid portion along the said predetermined path into power, passing the high-velocity vapor portion along a different predetermined path, condensing the vapor portion along the said different predetermined path, and feeding both the condensate and the passed liquid portion back at susbtantially the same pressure for re-heating.

2. A method of the character described, that comprises, heating a fluid to a predetermined temperature, convergently confining and divergently expanding the heated fluid to accelerate the same to obtain a high-velocity two-phase stream of lower temperature, separating the lower-temperature two-phase high-velocity stream into liquid and vapor portions, passing the high-velocity liquid portion along a predetermined path, converting the kinetic energy of the passing liquid portion along the said predetermined path into power, passing the high-velocity vapor portion along a different predetermined path, condensing the vapor portion along the said different predetermined path, and feeding both the condensate and the passed liquid portion back at substantially the same pressure for re-heating.

3. A method as claimed in claim 1 and in which the fluid is substantially a single fluid medium.

4. A method as claimed in claim 1 and in which the fluid comprises two immiscible fluid media.

5. A method of the character described, that comprises, boiling a liquid at a predetermined temperature to produce therefrom a mixed two-phase hot liquid and vapor output, accelerating the mixed hot liquid and vapor to obtain a high-velocity, two-phase stream of lower temperature, separating the lower temperature two-phase high-velocity stream into liquid and vapor portions, passing the high-velocity liquid portion along a predetermined path, converting the kinetic energy of the passing liquid portion along the said predetermined path into power, passing the high-velocity vapor portion along a different predetermined path, condensing the vapor portion along the said different predetermined path, and feeding both the condensate and the passed liquid portion back to substantially the same pressure for re-boiling.

6. A method of the character described, that comprises, boiling a liquid at a predetermined temperature to produce therefrom a mixed two-phase hot liquid and vapor output, convergently confining and divergently expanding the mixed hot liquid and vapor to accelerate the mixed hot liquid and vapor to obtain a high-velocity, two-phase stream of lower temperature, separating the lower temperature two-phase high velocity stream into liquid and vapor portions, passing the high-velocity liquid portion along a predetermined path, converting the kinetic energy of the passing liquid portion along the said predetermined path into power, passing the high-velocity vapor portion along a different predetermined path, condensing the vapor portion along the said different predetermined path, and feeding both the condensate and the passed liquid portion back at substantially the same pressure for re-boiling.

7. A method as claimed in claim 5 and in which the said liquid is substantially a single fluid medium.

8. Heat engine apparatus having, in combination, a source of fluid, means for heating the fluid to a predetermined temperature, means for accelerating the heated fluid to obtain a high-velocity two-phase stream of lower temperature, means for separating the lower-temperature two-phase high-velocity stream into liquid and vapor portions, means for converting the kinetic energy of the liquid portion into power and for feeding the same at a predetermined pressure back to the heating means, means for condensing the vapor portion of the high-velocity stream, and means for pressurizing the condensate to substantially the said predetermined pressure and feeding the same back to the heating means.

9. Apparatus as claimed in claim 8 and in which the fluid is substantially a single fluid medium.

10. Apparatus as claimed in claim 8 and in which the fluid comprises two immiscible fluid media.

11. Apparatus as claimed in claim 8 and in which the accelerating means comprises convergent-divergent nozzle means.

12. Apparatus as claimed in claim 8 and in which the separating means comprises vapor and liquid diffuser means.

13. Apparatus as claimed in claim 12 and in which the said diffuser means comprise diverging chamber means.

14. Apparatus as claimed in claim 8 and in which the heating means comprises liquid heating means for producing a saturated liquid and boiling means for boiling the same.

15. Apparatus as claimed in claim 8 and in which the energy converting means comprises one of magnetohydrodynamic generator, electrical generating means, hydraulic motor means and liquid turbine means.

16. Heat engine apparatus having, in combination, a source of liquid, means for boiling the liquid to produce therefrom a mixed two-phase hot liquid and vapor output at a predetermined temperature, means for accelerating the mixed hot liquid and vapor to transform the same into a high-velocity two-phase stream of lower temperature, means for separating the lower-temperature two-phase high-velocity stream into liquid and vapor portions, means for converting the kinetic energy of the liquid portion into power and for feeding the liquid portion at a predetermined pressure back into the boiling means, means for condensing the vapor portion of the high-velocity stream, and means for pressurizing the condensate to substantially the said predetermined pressure and feeding the same back to the boiling means.

17. Apparatus as claimed in claim 16 and in which the liquid is substantially a single fluid medium.

18. Heat engine apparatus having, in combination, a source of liquid, means for heating and boiling the liquid to produce therefrom a mixed two-phase hot liquid and vapor output at a predetermined temperature, nozzle means for accelerating the mixed hot liquid and vapor to transform the same into a high-velocity two-phase stream of lower temperature, means for separating the lower-temperature two-phase high-velocity stream into liquid and vapor portions, means for converting the kinetic energy of the liquid portion into power and for feeding the liquid portion at a predetermined pressure back to the heating and boiling means, means for condensing the vapor portion of the high-velocity stream, and means for pressurizing the condensate to substantially the said predetermined pressure and feeding the same back to the heating and boiling means.

References Cited

UNITED STATES PATENTS

| | | | |
|---|---|---|---|
| 1,230,417 | 6/1917 | Lillie | 60—40 |
| 1,601,384 | 9/1926 | Vianello | 60—92 |
| 2,035,726 | 3/1936 | Sheldon | 60—108 |
| 2,151,949 | 3/1939 | Turner | 60—40 |
| 2,258,167 | 10/1941 | Turner | 60—63 |
| 2,268,356 | 12/1941 | Turner | 60—73 |
| 2,924,074 | 2/1960 | Chambadal et al. | 60—73 |
| 3,024,611 | 3/1962 | Smith | 60—108 |
| 3,190,072 | 6/1965 | Berryer | 60—40 |

FOREIGN PATENTS

| | | |
|---|---|---|
| 1,120,433 | 4/1956 | France. |
| 162,544 | 3/1958 | Sweden. |

EDGAR W. GEOGHEGAN, *Primary Examiner.*

ROBERT R. BUNEVICH, MARTIN P. SCHWADRON,
*Examiners.*